United States Patent
Wu et al.

(10) Patent No.: US 7,032,983 B2
(45) Date of Patent: Apr. 25, 2006

(54) SILENT AND REDUCED VIBRATION CHAINWHEEL

(75) Inventors: Jonq-Shyan Wu, Tainan Hsien (TW); Chen-Hua Wu, Tainan (TW)

(73) Assignee: Ta Ya Chain Co., Ltd., Render Hsiang (TW)

( * ) Notice: Subject to any disclaimer, the term of this patent is extended or adjusted under 35 U.S.C. 154(b) by 0 days.

(21) Appl. No.: 10/664,241

(22) Filed: Sep. 17, 2003

(65) Prior Publication Data
US 2005/0057097 A1 Mar. 17, 2005

(51) Int. Cl.
*B62D 55/12* (2006.01)

(52) U.S. Cl. ........................... 305/195; 305/199
(58) Field of Classification Search ........... 305/193, 305/194, 195, 196, 197, 199, 115; 474/161
See application file for complete search history.

(56) References Cited

U.S. PATENT DOCUMENTS

| | | | | |
|---|---|---|---|---|
| 566,750 A | * | 9/1896 | Gardner | 474/91 |
| 975,938 A | * | 11/1910 | Downey | 474/161 |
| 1,870,801 A | * | 8/1932 | Engstrom | 474/156 |
| 2,003,528 A | * | 6/1935 | Best | 305/199 |
| 2,953,930 A | * | 9/1960 | Meyer | 474/148 |
| 3,057,219 A | * | 10/1962 | Montgomery | 474/161 |
| 3,499,340 A | * | 3/1970 | Teranishi et al. | 198/330 |
| 3,730,013 A | * | 5/1973 | Slemmons | 474/156 |
| 3,889,550 A | * | 6/1975 | Boggs et al. | 474/161 |
| 5,207,489 A | * | 5/1993 | Miller | 305/137 |
| 5,224,903 A | * | 7/1993 | Langhof et al. | 474/152 |
| 5,829,850 A | * | 11/1998 | Ketting et al. | 305/194 |
| 2004/0017108 A1 | * | 1/2004 | Moebs et al. | 305/125 |

\* cited by examiner

*Primary Examiner*—Russell D. Stormer
(74) *Attorney, Agent, or Firm*—Alan D. Kamrath; Nikolai & Mersereau, P.A.

(57) ABSTRACT

A silent and reduced vibration chainwheel includes a disk, multiple teeth and an energy absorber. The disk has an outer edge, two opposite sides and at least one recess. The teeth are formed radially at and extend out from the outer edge of the disk. The energy absorber is made of resilient material and is mounted in the at least one recess at the outer edge of the disk to absorb the impact of a chain driven by or driving the chainwheel and reduce the noise and vibrations caused by the impact of the chain and the chainwheel. The energy absorber can be resilient annular rings, strips, rods or a combination of them. Therefore, the chainwheel is silent and fewer vibrations are produced so a person who uses a machine that has the chainwheel will feel comfortable.

6 Claims, 12 Drawing Sheets

SILENT AND REDUCED VIBRATION CHAINWHEEL

BACKGROUND OF THE INVENTION

1. Field of the Invention

The present invention relates to a chainwheel, and more particularly to a chainwheel that is silent and reduces vibrations caused by a chain being turned on the chainwheel.

2. Description of Related Art

Figure 13:
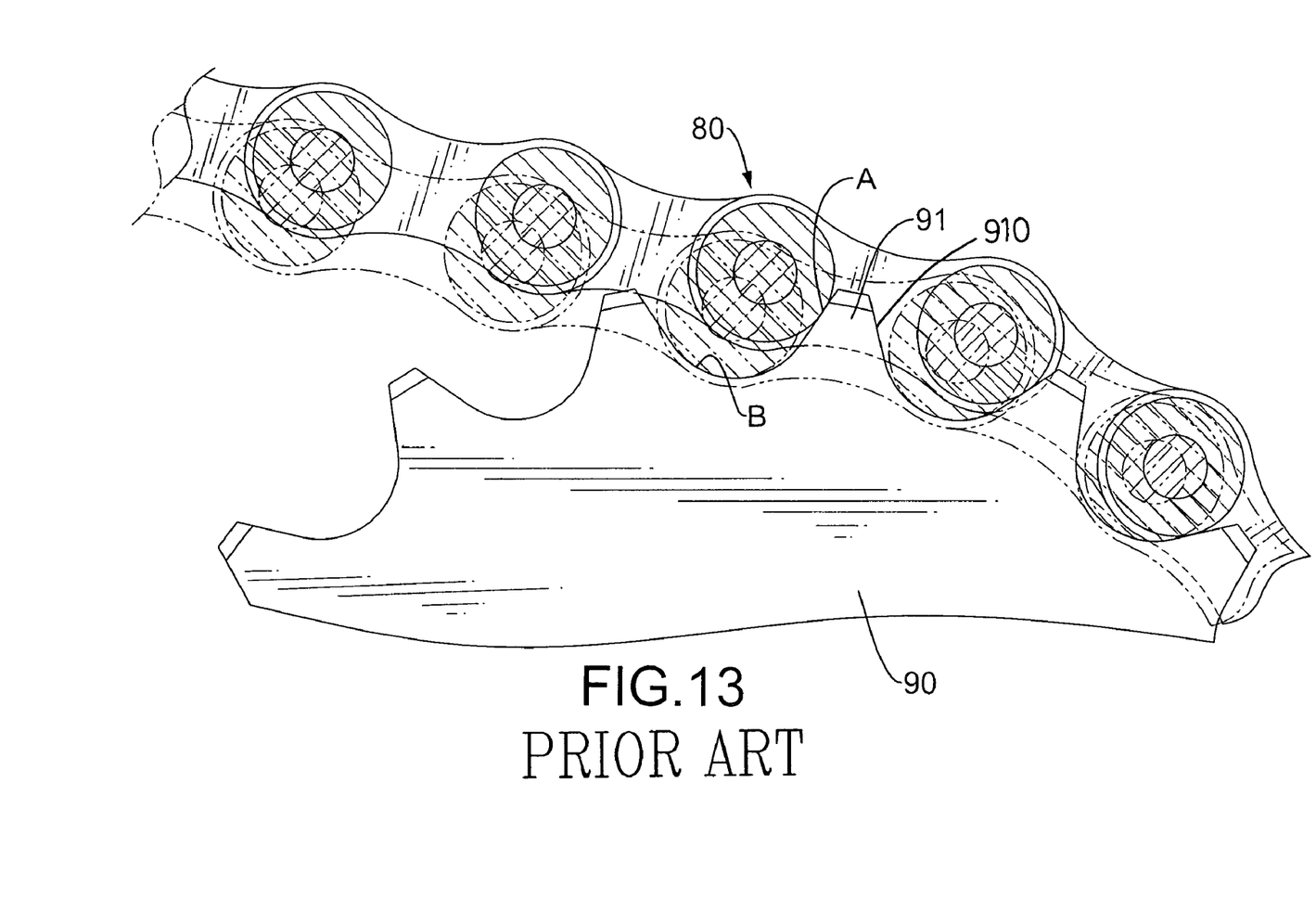
FIG. 13 is an operational side plan view of a segment of a conventional chainwheel in accordance with the prior art.

A chainwheel or a sprocket wheel that engages the holes in the links of a chain when the chainwheel is rotating is a common mechanism for power transmission. With reference to FIG. 13, a chainwheel (90) in accordance with the prior art meshes with an endless chain (80) that has a hole (not numbered) between each link (not numbered). The chainwheel (90) comprises a disk (not numbered) and multiple teeth (91). The disk has an outer edge (not numbered), and the multiple teeth (91) are integrally formed on and extend radially out from the outer edge of the disk. Multiple bottom lands (B) are formed between each pair of adjacent teeth (91) when the teeth (91) are formed. Each tooth (91) has a tooth profile (910) with a pitch point (A). The pitch point (A) of the tooth profile (910) is at the intersection of the tooth profile (910) with an imaginary pitch circle (not shown) and is a point on the tooth profile (910) that initially contacts links of the chain (80).

When the chainwheel (90) rotates, the teeth (91) will respectively fit into the holes in the chain (80) to transmit mechanical power either from the chainwheel (90) to the chain (80) or from the chain (80) to the chainwheel (90). The chain (80) comes in contact with both the pitch point (A) and the bottom lands (B) in the chainwheel (90) during operation. Noise and vibrations will be generated by the contact between the chain (80) and the chainwheel (90). When the chainwheel (90) is rotated at a high speed, the chain (80) will rapidly strike the chainwheel (90), which will cause more noise and vibrations.

The undamped noise and vibrations will be transmitted to other parts of a mechanism (not shown) that uses the chain (80) and chainwheel (90) to transmit power. For example, an exercise bike (not shown) in a gym may use a chain (80) and a chainwheel (90) to transmit physical power generated by a person's feet applying pressure to pedals of the bike to turn a wheel (not shown). However, the noise and vibrations generated by the chain (80) and chainwheel (90) will make a person riding or standing near the exercise bike uncomfortable.

To overcome the shortcomings, the present invention provides an improved chainwheel to mitigate or obviate the aforementioned problems.

SUMMARY OF THE INVENTION

The main objective of the invention is to provide a chainwheel that is silent when the chainwheel is driving or being driven by a chain.

Another objective of the invention is to provide a chainwheel that will reduce the vibrations generated when the chainwheel engages or is engaged by a chain.

Other objectives, advantages and novel features of the invention will become more apparent from the following detailed description when taken in conjunction with the accompanying drawings.

DETAILED DESCRIPTION OF PREFERRED EMBODIMENT

A chainwheel in accordance with the present invention comprises a disk, multiple teeth and an energy absorber. The chainwheel meshes with a chain that has multiple holes and rotates or is rotated by the chain. The disk is generally made of metal and has an outer edge, two opposite sides and at least one recess between adjacent teeth. The teeth are formed integrally with and extend radially out from the outer edge of the disk to form a bottom land between adjacent teeth. Each tooth has a tooth profile with a pitch point. The energy absorber can be made of material such as urethane to absorb shock generated when the chainwheel and the chain contact each other, thereby reducing both vibrations and noise.

Figure 1:
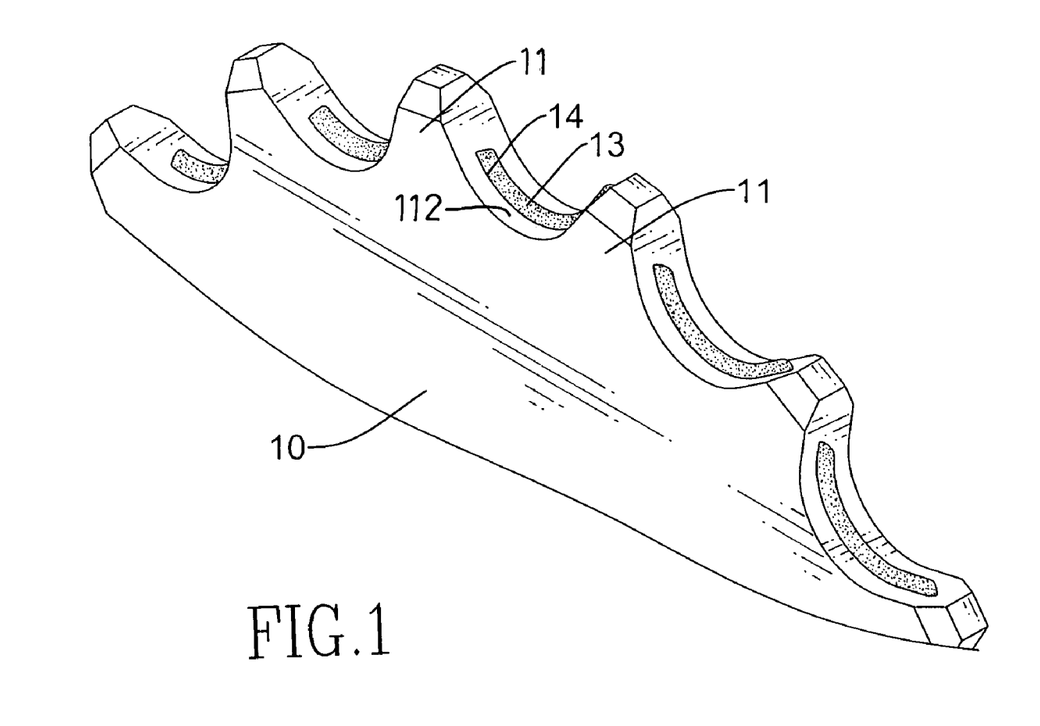
FIG. 1 is an enlarged perspective view of a segment of a first embodiment of a chainwheel in accordance with the present invention.
Figure 2:
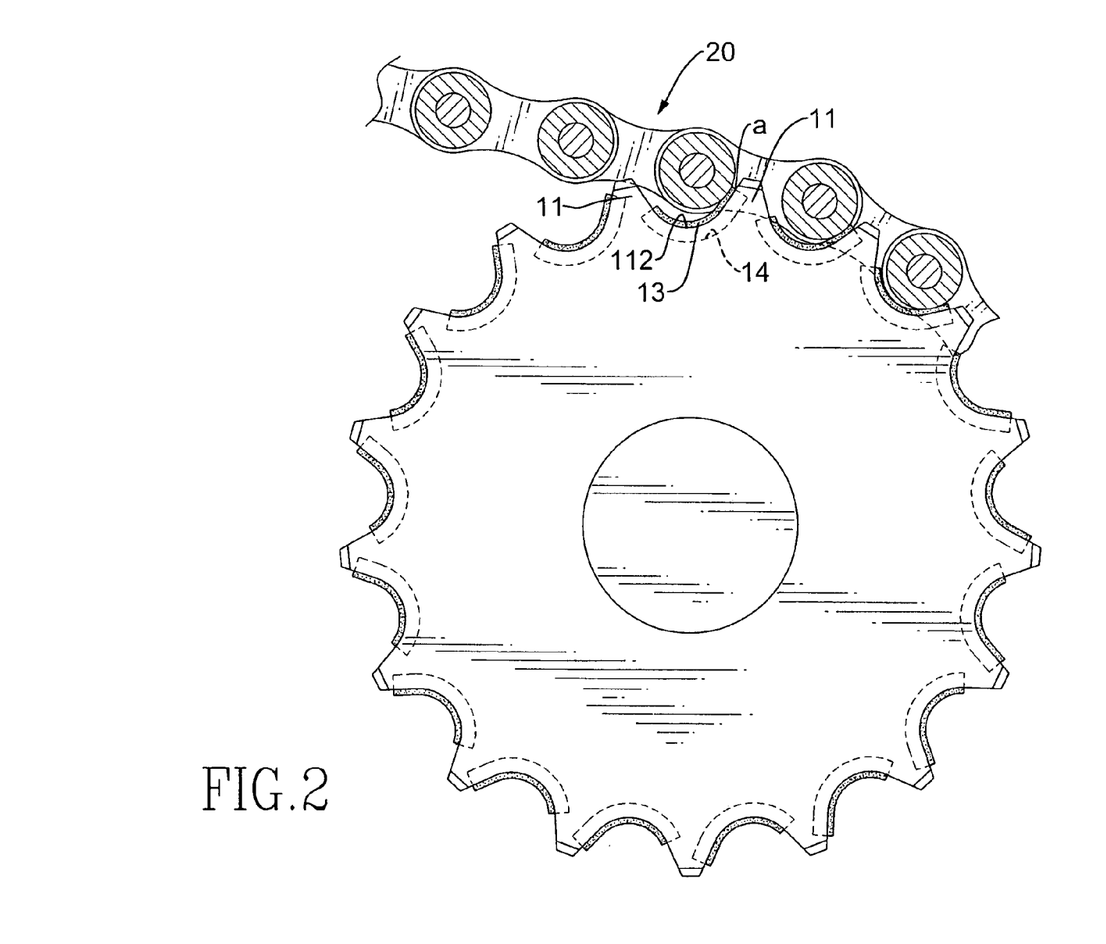
FIG. 2 is an operational side plan view of the chainwheel in FIG. 1 with a chain engaging or engaged by the chainwheel.
Figure 3:
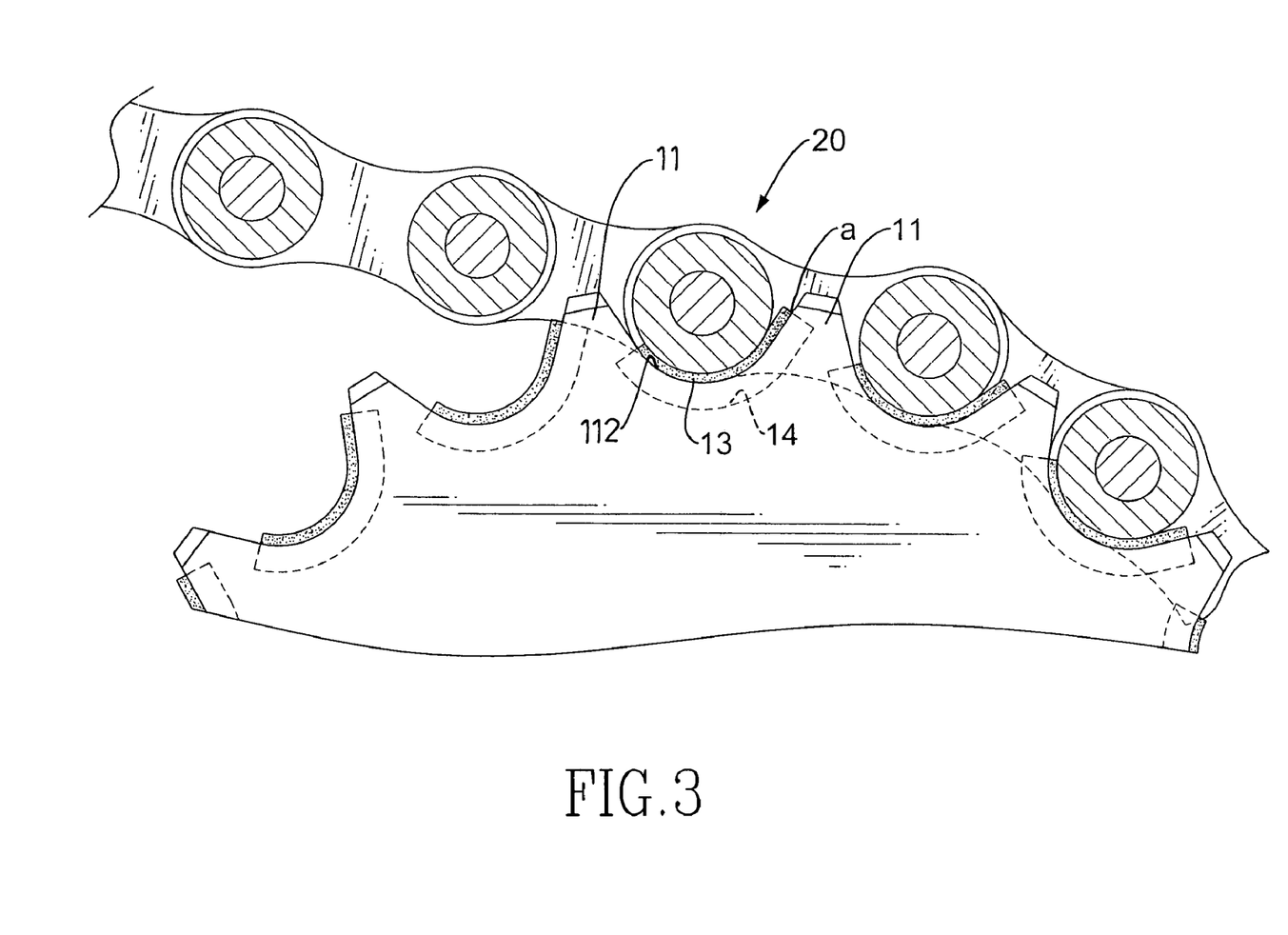
FIG. 3 is an enlarged operational side plan view of a segment of the chainwheel in FIG. 2.

With reference to FIGS. 1, 2 and 3, the first embodiment of the chainwheel in accordance with the present invention meshes with a chain (20) and implements the at least one recess with multiple recesses (14) and the energy absorber with resilient strips (13). The teeth (11) are formed integrally with and extend radially out from the outer edge of the disk (10) to form a bottom land (112) between adjacent teeth (11). The recesses (14) are defined respectively in the bottom lands (112) and extend to the pitch point (a) based on a single direction of rotation of the chainwheel. The resilient strips (13) are mounted respectively in the recesses (14) by molding.

Figure 4:
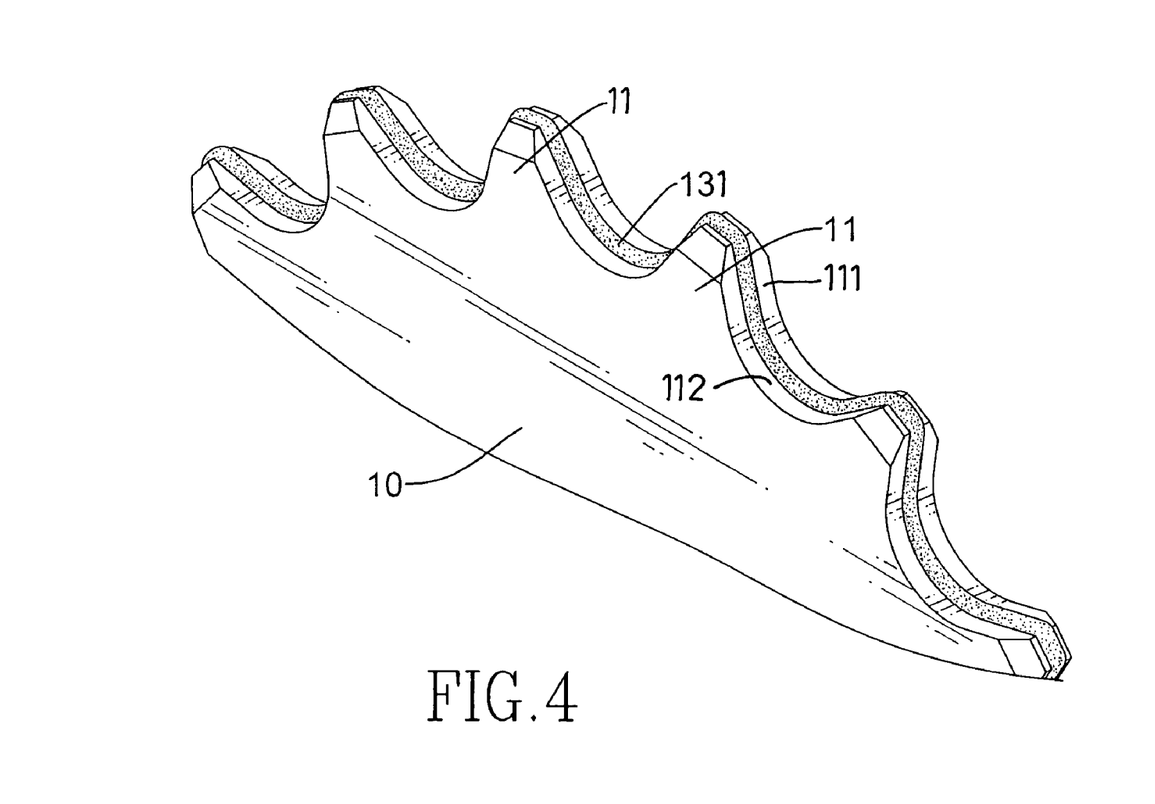
FIG. 4 is an enlarged perspective view of a segment of a second embodiment of a chainwheel in accordance with the present invention.

With reference to FIG. 4, a second embodiment of the chainwheel in accordance with the present invention implements the energy absorber with a continuous annular resilient strip (131) and the at least one recess with a continuous annular groove (not shown). The annular groove is defined in the outer edge of the disk (10), the tooth profiles (111) and the bottom lands (112). The annular resilient strip (131) is mounted and held in the annular groove.

Figure 5:
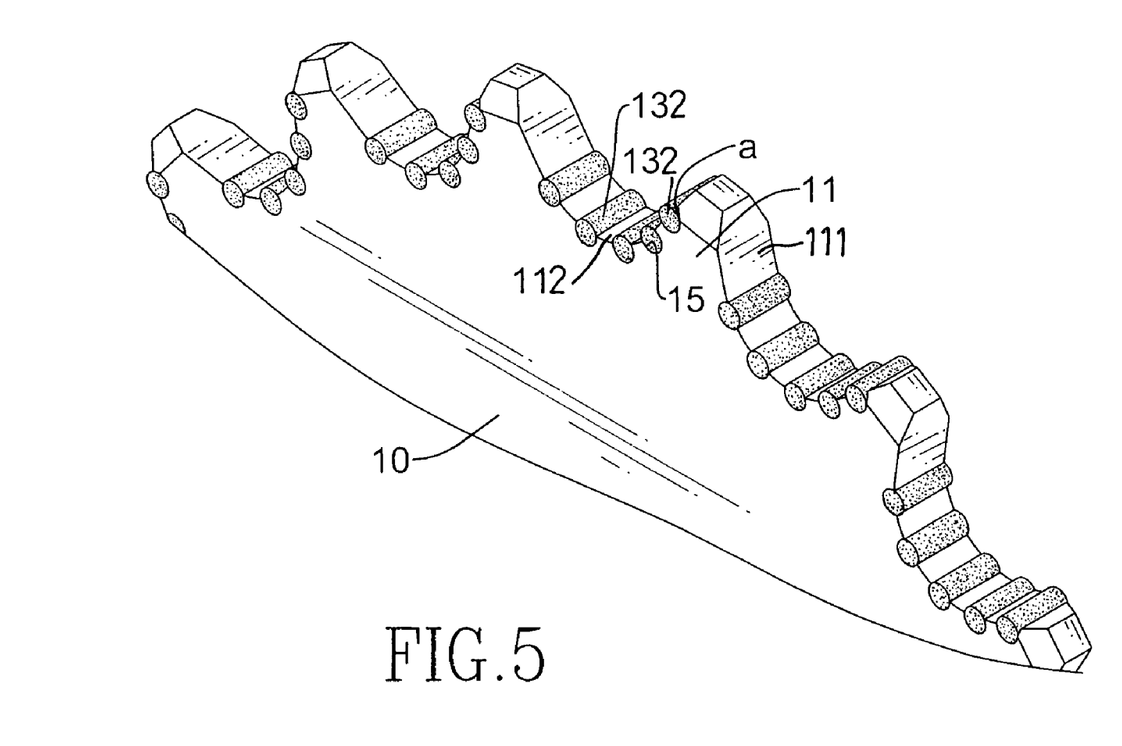
FIG. 5 is an enlarged perspective view of a segment of a third embodiment of a chainwheel in accordance with the present invention.

With reference to FIG. 5, a third embodiment of the chainwheel in accordance with the present invention implements the energy absorber with multiple resilient rods (132) and the at least one recess with multiple transverse recesses (15). The transverse recesses (15) are defined in the bottom lands (112) and formed in the bottom lands (112) to the pitch points (a) based on a single direction of rotation of the chainwheel. The resilient rods (132) are mounted respectively in the transverse recesses (15).

Figure 6:
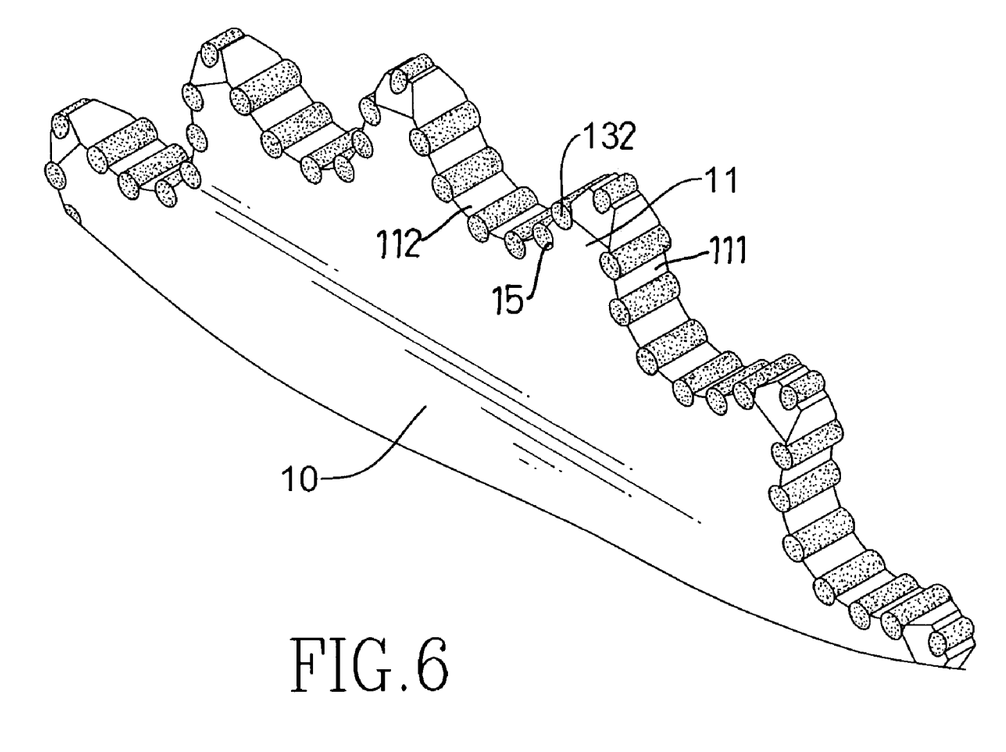
FIG. 6 is an enlarged perspective view of a segment of a fourth embodiment of a chainwheel in accordance with the present invention.

With reference to FIG. 6, a fourth embodiment of the chainwheel in accordance with the present invention implements the energy absorber with multiple resilient rods (132) and the at least one recess with multiple transverse recesses (15). The transverse recesses (15) are defined around the entire outer edge of the disk (10), the bottom lands (112) and the tooth profiles (111). The resilient rods (132) are mounted respectively in the transverse recesses (15).

Figure 7:
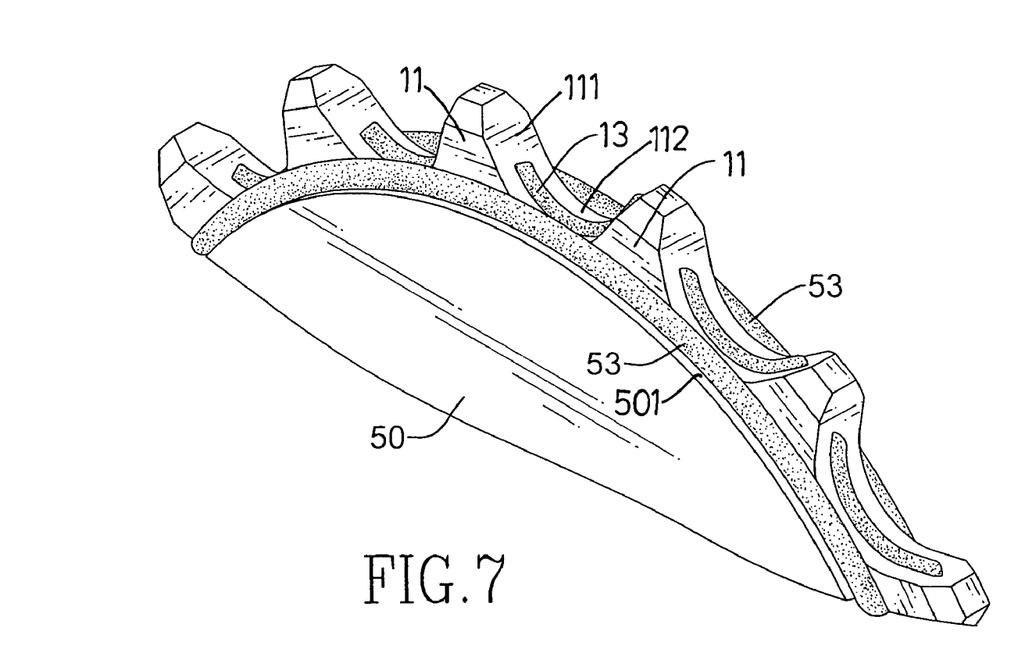
FIG. 7 is an enlarged perspective view of a segment of a fifth embodiment of a chainwheel in accordance with the present invention.

With reference to FIG. 7, a fifth embodiment of the chainwheel in accordance with the present invention further comprises two side disks (50), and the energy absorber is implemented with multiple resilient strips (13) and two resilient rings (53) and the at least one recess with multiple recesses (14). The resilient strips (13) and the recesses (14) have the same configuration as the first embodiment of the chainwheel. The side disks (50) are smaller than the disk (10) forming the chainwheel, have, respectively, outer edges (not numbered) and are concentrically mounted respectively on opposite sides of the chainwheel disk (10). The outer edges of the side disks (50) form annular shoulders (501) respectively on opposite sides of the chainwheel disk (10) at the teeth (11). The resilient rings (53) are mounted, respectively, on the annular shoulders (501) on the side disks (50).

Figure 8:
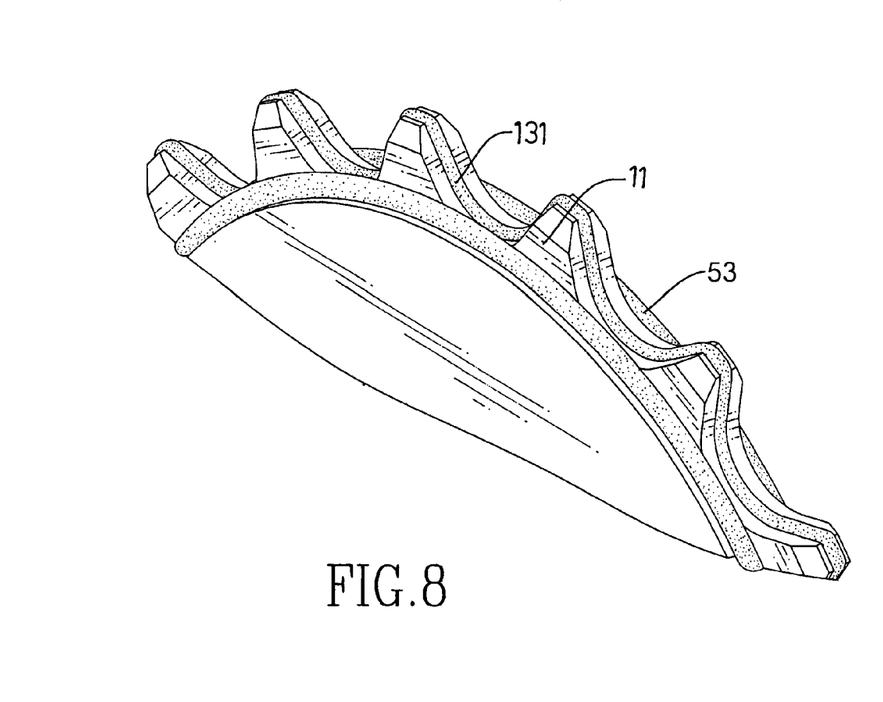
FIG. 8 is an enlarged perspective view of a segment of a sixth embodiment of a chainwheel in accordance with the present invention.

With reference to FIG. 8, a sixth embodiment of the chainwheel in accordance with the present invention is a modification of the fifth embodiment of the chainwheel where the energy absorber is implemented with a continuous annular strip (131) and two resilient rings (53) and the at least one recess with a continuous annular groove (not shown) that are previously described.

Figure 9:
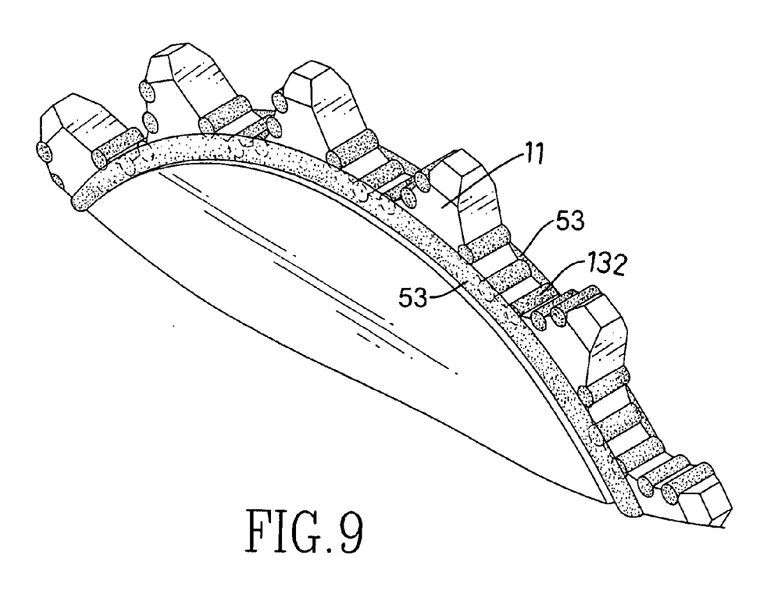
FIG. 9 is an enlarged perspective view of a segment of a seventh embodiment of a chainwheel in accordance with the present invention.

With reference to FIG. 9, a seventh embodiment of the chainwheel in accordance with the present invention is another modification of the fifth embodiment of the chainwheel where the energy absorber is implemented with multiple resilient rods (132) as previously described in the third embodiment of the chainwheel and the two annular rings (53) described in the fifth embodiment of the chainwheel.

Figure 10:
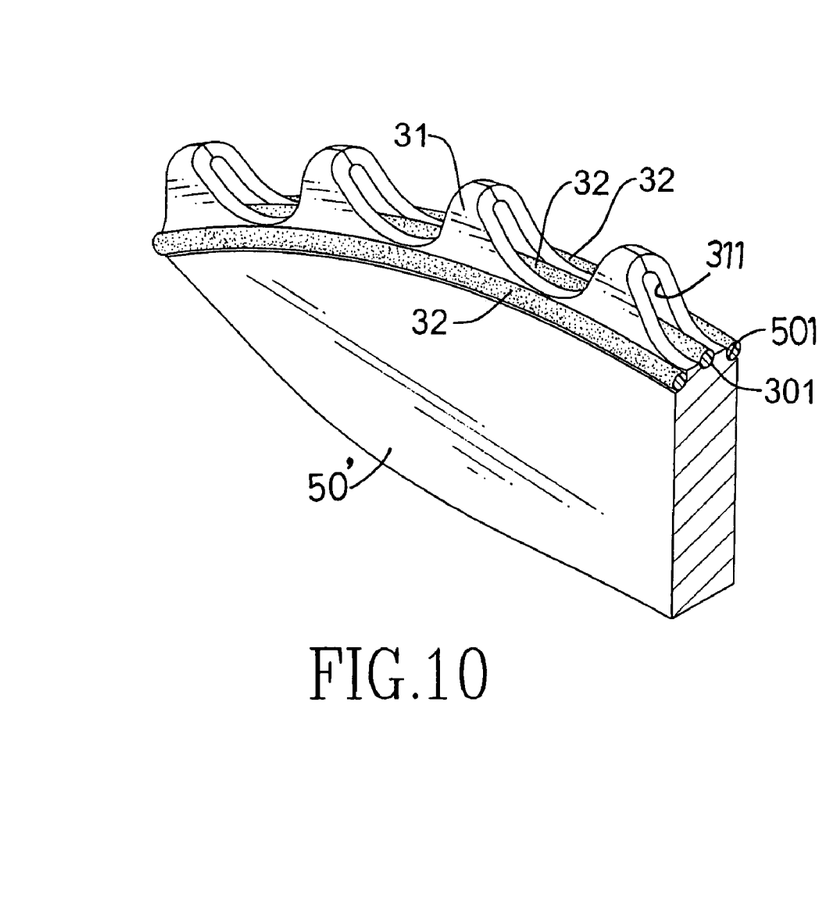
FIG. 10 is an enlarged perspective view in partial section of a segment of an eighth embodiment of a chainwheel in accordance with the present invention.
Figure 11:
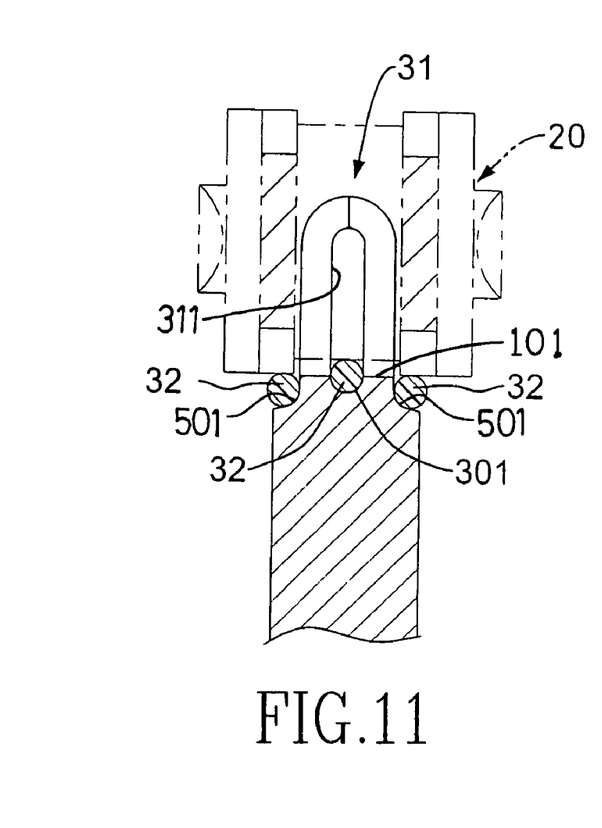
FIG. 11 is an operational cross sectional end view of the chainwheel in FIG. 10 with a chain engaging or engaged by the chainwheel.

With reference to FIGS. 10 and 11, an eighth embodiment of the chainwheel in accordance with the present invention is a further modification to the fifth embodiment of the chainwheel. The teeth (31) are radially hollow to form passages (311), the energy absorber includes three resilient rings (32) and the at least one recess further comprises an annular groove (301) in addition to the two annular shoulders (501) and the passages (311). The annular groove (301) is defined in the outer edge (101) of the disk (10) forming the chainwheel and passes through the hollow teeth (31), and the two annular shoulders (501) are defined respectively in the side disks (50') at the outer edges. The teeth (31) are integrally formed at the outer edge of the disk (10) forming the chainwheel. Each tooth (31) has a passage (311) over the central annular groove (301). Two of the three resilient rings (32) are mounted respectively in the annular shoulders (501), and the other resilient ring (32) is mounted in the annular groove (301).

Figure 12:
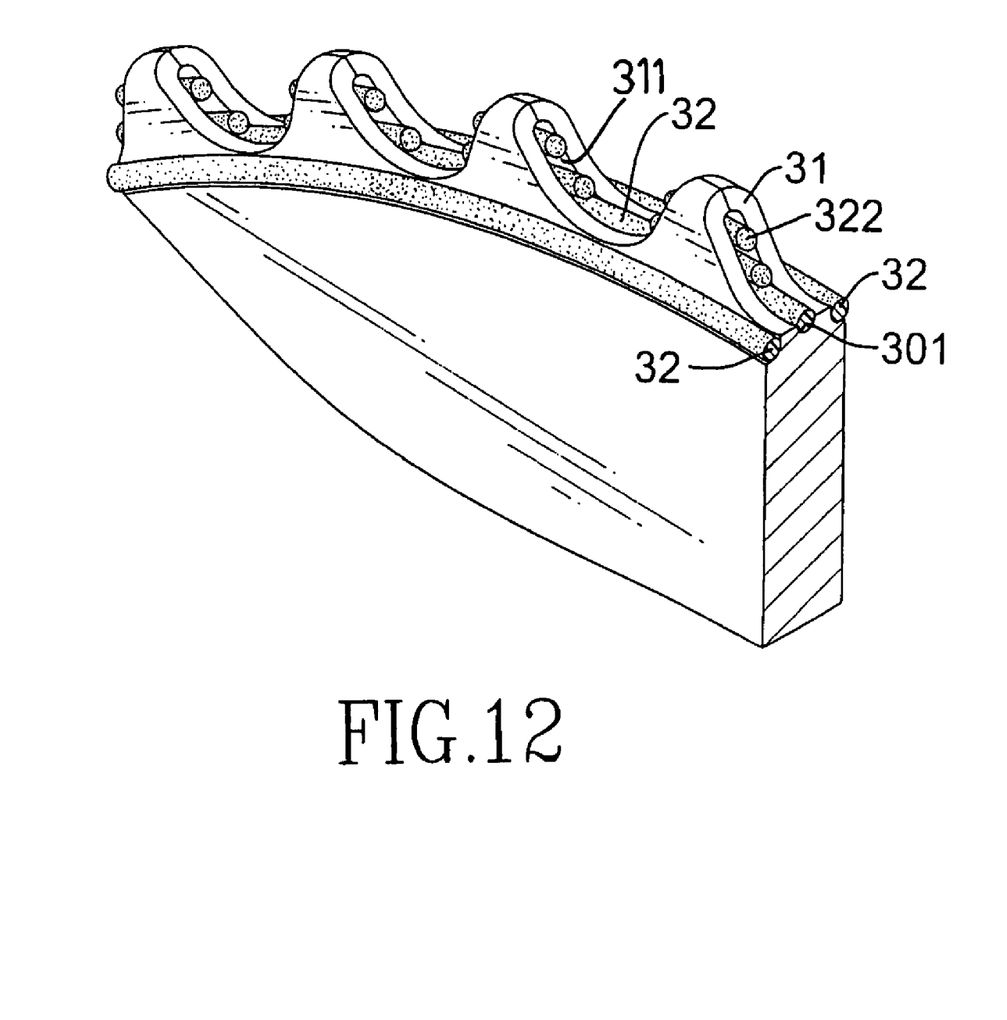
FIG. 12 is an enlarged perspective view in partial section of a section of a ninth embodiment of a chainwheel in accordance with the present invention.

With reference to FIG. 12, a ninth embodiment of the chainwheel in accordance with the present invention is a modification of the eighth embodiment of the chainwheel where the energy absorber further comprises multiple resilient rods (322). The resilient rods (322) are mounted respectively in the passages (311) in the teeth (31).

In all the embodiments, the teeth (11, 31) fit into the holes in the chain (20), and the energy absorber in the form of resilient annular rings (32, 53), rods (131, 132, 322) or strips (13) will dissipate the impact between the chainwheel and the chain (20). The vibrations and noises caused by the impact will be reduced because of the reduction in the impact. Consequently, the chainwheel in accordance with the present invention will be silent and produce fewer vibrations.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A silent and reduced vibration chainwheel for meshing with a chain, and comprising:
    a disk having an outer edge, two opposite sides and at least one recess;
    multiple teeth formed with and extending radially out from the outer edge of the disk and forming a bottom land between adjacent teeth and each tooth having a tooth profile with a pitch point; and
    an energy absorber made of resilient material and mounted at the outer edge of the disk in the at least one recess to absorb shock generated when the chainwheel and the chain contact each other, thereby reducing both vibrations and noise,
    wherein the teeth are hollow to form a passage in each tooth;
    the at least one recess in the disk is implemented with a continuous annular groove defined around the outer edge, and extending through and communicating with the passages in the teeth; and
    the energy absorber comprises a continuous resilient annular strip mounted in the annular groove and extending through the passages in the teeth and around the edge.

2. The silent and reduced vibration chainwheel as claimed in claim 1, wherein the chainwheel further comprises:
    two side disks smaller than the disk forming the chainwheel, having respectively outer edges and disposed on opposite sides of the disk such that the outer edges of the side disks form two annular shoulders respectively on opposite sides of the chainwheel disk at the teeth; and
    the at least one recess further comprises the two shoulders, and the energy absorber further comprises two resilient annular rings mounted respectively on the annular shoulders.

3. The silent and reduced vibration chainwheel as claimed in claim 2 wherein the energy absorber comprises multiple, continuous resilient annular strips extending through the passages in the teeth.

4. The silent and reduced vibration chainwheel as claimed in claim 1, wherein
the chainwheel further comprises:
two side disks smaller than the disk forming the chainwheel, having respectively outer edges and disposed on opposite sides of the disk such that the outer edges of the side disks form two annular shoulders respectively on opposite sides of the chainwheel disk;
the at least one recess is implemented with the two annular shoulders in addition to multiple passages defined respectively in the teeth and a central annular groove defined between the annular shoulders and passing through the teeth; and
the energy absorber is implemented with three resilient annular rings mounted respectively on the annular shoulders and in the central annular groove.

5. The silent and reduced vibration chainwheel as claimed in claim 4 wherein the energy absorber comprises multiple, continuous resilient annular strips extending through the passages in the teeth.

6. The silent and reduced vibration chainwheel as claimed in claim 1 wherein the energy absorber comprises multiple, continuous resilient annular strips extending through the passages in the teeth.

* * * * *